United States Patent
Xu et al.

(10) Patent No.: US 9,578,549 B2
(45) Date of Patent: Feb. 21, 2017

(54) METHOD AND APPARATUS FOR SUPPORTING RLF REASON DETECTION OR HANDOVER FAILURE REASON DETECTION

(71) Applicant: Samsung Electronics Co., Ltd., Suwon-si, Gyeonggi-do (KR)

(72) Inventors: Lixiang Xu, Beijing (CN); Hong Wang, Beijing (CN); Huarui Liang, Beijing (CN); Xiaowan Ke, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 273 days.

(21) Appl. No.: 14/399,802

(22) PCT Filed: May 6, 2013

(86) PCT No.: PCT/KR2013/003898
§ 371 (c)(1),
(2) Date: Nov. 7, 2014

(87) PCT Pub. No.: WO2013/168937
PCT Pub. Date: Nov. 14, 2013

(65) Prior Publication Data
US 2015/0098448 A1 Apr. 9, 2015

(30) Foreign Application Priority Data
May 11, 2012 (CN) .......................... 2012 1 0146678

(51) Int. Cl.
*H04W 36/00* (2009.01)
*H04W 76/02* (2009.01)
(Continued)

(52) U.S. Cl.
CPC ......... *H04W 36/0005* (2013.01); *H04W 24/04* (2013.01); *H04W 24/10* (2013.01); *H04W 76/026* (2013.01); *H04W 36/08* (2013.01)

(58) Field of Classification Search
CPC .. H04W 36/0005; H04W 36/08; H04W 24/08; H04W 24/10; H04W 76/026
See application file for complete search history.

(56) References Cited

U.S. PATENT DOCUMENTS

| 2009/0046573 | A1 | 2/2009 | Damnjanovic |
| 2010/0120399 | A1* | 5/2010 | Guo ................. H04L 29/12207 455/411 |

(Continued)

OTHER PUBLICATIONS

Zte, "Handover Cause Report for Mobility Robustness Optimization", Nov. 9-13, 2009, 3GPP TSG RAN WG3 #66, R3-092982, pp. 1-4.*

(Continued)

*Primary Examiner* — Paul H Masur
(74) *Attorney, Agent, or Firm* — Jefferson IP Law, LLP

(57) ABSTRACT

A method and apparatus for supporting Radio Link Failure (RLF) reason detection or handover failure reason detection are provided. The method includes detecting the Mobility Robustness Optimization (MRO) problems without RLF reporting in a $3^{rd}$ Generation (3G) or a $2^{nd}$ Generation (2G) mobile communication system, the impact on a 3G or a 2G mobile communication system is reduced, and then correct self-optimization is performed to improve the performance of the mobile communication system.

16 Claims, 9 Drawing Sheets

(51) Int. Cl.
    *H04W 24/10*     (2009.01)
    *H04W 24/04*     (2009.01)
    *H04W 36/08*     (2009.01)

(56) References Cited

U.S. PATENT DOCUMENTS

| | | | |
|---|---|---|---|
| 2010/0190499 A1* | 7/2010 | Wu | H04W 36/0066 |
| | | | 455/436 |
| 2010/0278147 A1 | 11/2010 | Horn et al. | |
| 2011/0077010 A1 | 3/2011 | Xu et al. | |
| 2011/0188446 A1* | 8/2011 | Bienas | H04W 74/00 |
| | | | 370/328 |
| 2012/0069732 A1 | 3/2012 | Xu et al. | |
| 2012/0250498 A1* | 10/2012 | Johansson | H04L 41/0604 |
| | | | 370/221 |
| 2013/0083667 A1* | 4/2013 | Persson | H04W 24/10 |
| | | | 370/242 |

OTHER PUBLICATIONS

3GPP TS 36.331, V8.16.0 (Dec. 2011), 3rd Generation Partnership Project; Technical Specification Group Radio Access Network; Evolved Universal Terrestrial Radio Access (E-UTRA); Radio Resource Control (RRC); Protocol Specification (Release 8).
Nokia Siemens Networks, "RLF Reports for Mobility Robustness Optimization", 3GPP TSG RAN WG3, May 4-9, 2009, San Francisco, CA, R3-091357.
Huawei, "UTRAN inter RAT MRO", 3GPP TSG RAN WG3, Feb. 6-10, 2012, Dresden, Germany, R3-120125.
Huawei, "IRAT MRO way forward", 3GPP TSG RAN WG3, Feb. 6-10, 2012, Dresden, Germany, R3-120390.
Huawei, "Inter RAT MRO", 3GPP TSG RAN WG3, Mar. 26-30, 2012, San Jose del Cabo, Mexico, R3-120574.

\* cited by examiner

METHOD AND APPARATUS FOR SUPPORTING RLF REASON DETECTION OR HANDOVER FAILURE REASON DETECTION

CROSS-REFERENCE TO RELATED APPLICATION(S)

This application is a U.S. National Stage application under 35 U.S.C. §371 of an International application filed on May 6, 2013 and assigned application number PCT/KR2013/003898, which claimed the benefit of a Chinese patent application filed on May 11, 2012 in the Chinese Intellectual Property Office and assigned Serial number 201210146678.1, the entire disclosure of which is hereby incorporated by reference.

TECHNICAL FIELD

The present disclosure relates to a mobile communication field. More particularly, the present disclosure relates to a method and apparatus for supporting Radio Link Failure (RLF) reason detection or handover failure reason detection.

BACKGROUND

With development of communication technologies, a mobile communication system has developed a System Architecture Evolution (SAE) system.

FIG. 1 is a schematic diagram illustrating a structure of an existing SAE system according to the related art.

Referring to FIG. 1, the system includes an Evolved-Universal Terrestrial Radio Access Network (E-UTRAN) 101 that includes a Core Network (CN) of a Mobile Management Entity (MME) 105 and a Serving GateWay (S-GW) 106. The E-UTRAN 101 is configured to connect a User Equipment (UE) to the core network, and further includes at least one evolved Node B (eNB) 102 and one Home Node B (HeNB) 103, and optionally includes a Home evolved Node B GateWay (HeNB GW) 104. The MME 105 and S-GW 106 may be implemented in one module or be divided for independent implementation. Herein, eNB 102s connect with each other through an X2 interface and connect with MME 105 and S-GW 106 through an S1 interface. The HeNB 103 directly connects with MME 105 and S-GW 106 through the S1 interface. Alternatively, the HeNB 103 connects with the optional HeNB GW 104 through the S1 interface, and then HeNB GW 104 connects with MME 105 and S-GW 106 through the S1 interface.

In an early stage of establishment of a SAE system or in an operation process of the SAE system, configuring the SAE system to optimize parameters consumed significant manpower and material resources, especially the setting for a wireless parameter to ensure a good coverage and capacity, mobility robustness, mobility load balancing, and an access speed for the UEs. In order to save the manpower and material resources configurations cost in the operation of the SAE system, at present, a self-optimization method for SAE system is proposed. During a process of self-optimization, a configuration for an eNB or a HeNB is optimized according to a current state of the SAE system. Hereinafter the eNB and HeNB are referred to as an eNB respectively to describe the self-optimization method for SAE system.

FIG. 2 is a schematic diagram illustrating a basic principle for performing a self-optimization to a SAE system according to the related art.

Referring to FIG. 2, after an eNB is powered on or accesses a SAE, the eNB may perform a self-configuration process. The self-configuration process includes a basic configuration for the eNB and an initial radio parameter configuration. Herein, the basic configuration for the eNB includes configuring an Internet Protocol (IP) address for the eNB and detecting the Operation, maintenance and Management (OA&M), authentication between the eNB and the core network and downloading a parameter of software and operations of the eNB for self-configuration. When the eNB is a HeNB, it is also needed to detect to which HeNB GW the HeNB belongs. The initial radio parameter configuration is implemented in accordance with experiences or simulations and performance of each eNB within the SAE system will be influenced by environment of an area where the eNB is located, thus the eNB needs to initialize the radio parameter configuration according to the environment of the area where the eNB located, and performs an initial configuration for a neighbor list and an initial configuration for load balancing. After the self-configuration process is completed, parameters configured by the eNB are not optimal and, in order to achieve a better performance in the SAE system, it is necessary to optimize or adjust the configuration of the eNB, which is also known as a self-optimization of the mobile communication system. When the configuration of an eNB is optimized or adjusted, it may be performed by the eNB controlled by a back-stage OA&M, which a standardized interface may exist between the OA&M and the eNB. The OA&M sends a parameter to be optimized to the eNB (which may be an eNB or a HeNB) through the interface and the eNB optimizes the parameter. Of course, the parameter optimization may also be performed by the eNB itself, i.e., the eNB detects that the performance is to be optimized and then optimizes or adjusts a corresponding parameter. Optimization or adjusting for the configuration of an eNB may include self-optimization for a neighbor list, self-optimization for coverage and capacity, self-optimization for mobility robustness, self-optimization for load balancing and self-optimization for a parameter of a Random Access CHannel (RACH), etc.

Currently, a basic principle of self-optimization for mobility robustness within version 10 is that, when a UE encounters a RLF or a handover failure, the UE indicates that an RLF report is available when the UE re-enters a connection mode. The network sends a message to the UE to request the RLF report, wherein the RLF report sent by the UE includes an E-UTRAN Cell Global Identifier (ECGI) of a cell last serving the UE, an ECGI of a cell trying to re-establish, an ECGI of a cell last triggering a handover process, the time from the last triggering handover to a connection failure, a reason of the connection failure is a RLF or a handover failure, and a radio measurement. A base station obtaining the RLF report forwards the RLF report to a base station located where the cell last serving the UE. The base station last serving the UE determines whether it is a too early handover, or a too-late handover, or handing over to a wrong cell, or overwriting a vulnerability. If the RLF report indicates a too early handover or handing over to a wrong cell, the base station sends information about the too early handover or a handover to a wrong cell to a base station that triggered the too early handover or handing over to a wrong cell.

However, when an existing mechanism is applied to a RLF detection or a handover failure detection in inter-Radio Access Technologies (inter-RAT), if it is necessary for a UE to report a RLF report to a third Generation mobile communication system (3G) or a second Generation mobile communication system (2G), there are a relatively large impact on a UE of 3G and 2G.

A method for reducing the impact on a terminal of 2G/3G is, when a problem cell is a 3G cell or a 2G cell, and/or a cell trying to re-establish firstly after a failure also is a 3G cell or a 2G cell, a UE does not send a RLF report to a Radio Network Controller (RNC)/Base Station System (BSS). The RNC or BSS detects a reason of the failure itself. However, the method has problems as follows.

Problem 1: For a RLF failure, when a UE reestablishes a Radio Resource Control (RRC) connection to a RNC, a UE identifier sent to the RNC by the UE may not be a UE identifier saved in the RNC, so that the RNC could not find UE context and could not obtain historical information of the UE, thereby a reason for the RLF failure could not be detected.

Problem 2: For a handover between 2G and LTE, such as a procedure in which 2G executes a Cell Change Order (CCO) to a UE to LTE, which does not result from a RLF, a source RNC could not distinguish between the RLF and the CCO.

Problem 3: for a too early handover from 3G/2G to LTE, a RNC needs to detect a reason for a failure itself. In order to support other cases in future, such as a wrong cell handover from 3G/2G to LTE, it is still necessary for a UE to send a RLF report to the LTE. An eNB sends a handover report to the RNC after detecting the reason for the failure; therefore the RNC will count the same failure event repeatedly.

Problem 4: When a RNC for establishing a RRC connection when a UE backs to the 3G/2G is different from a source RNC before a handover, how to detect a reason of a failure.

Problem 5: for a successful handover from 3G/2G to LTE, a RLF occurs in a UE soon, then the UE accesses back to 3G/2G to establish a RRC connection, a problem of whether a RLF report is sent from the UE to a LTE base station is unclear. If the RLF report is not reported, an operation of an existing UE will be influenced. If the RLF report is reported, some information is not obtained. How to report and how an eNB to deal with the RLF report after receiving it are all unclear problems.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus to solve above-mentioned problems, so as to avoid a User Equipment (UE) sending a Radio Link Failure (RLF) report in a third Generation mobile communication system (3G) or a second Generation mobile communication system (2G), and therefore reduce the impact on 3G and 2G.

Another aspect of the present disclosure is to provide a method for supporting a RLF reason detection or a handover failure reason detection, in which the Mobility Robustness Optimization (MRO) problems can be detected without RLF reporting in 3G or 2G, the impact on a 3G or a 2G system is reduced, and then the correct self-optimization is performed to a mobile communication system to improve the performance of the mobile communication system.

By adopting the method for supporting RLF reason detection or handover failure reason detection provided by the present disclosure, the MRO problems can be detected without RLF reporting in 3G or 2G, the impact on a 3G or a 2G system is reduced and the correct self-optimization is performed to a mobile communication system to improve the performance of the mobile communication system.

Other aspects, advantages, and salient features of the disclosure will become apparent to those skilled in the art from the following detailed description, which, taken in conjunction with the annexed drawings, discloses various embodiments of the present disclosure.

DESCRIPTION OF DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

To solve problems existing in conventional systems, the present disclosure proposes a method for supporting Radio Link Failure (RLF) reason detection or handover failure reason detection.

When the method provided by the present disclosure is applied, the Mobility Robustness Optimization (MRO) problems can be detected without reporting a Radio Link Failure (RLF) is a second Generation (2G) or third Generation (3G) system, the impact on the 2G or 3G system is reduced, and then the correct self-optimization is performed to improve the performance of the mobile communication system.

The present disclosure is hereinafter described in detail with reference to accompanying drawings and various embodiments, so as to make the objective, technical means and merits of the present disclosure more apparent.

Figure 1:
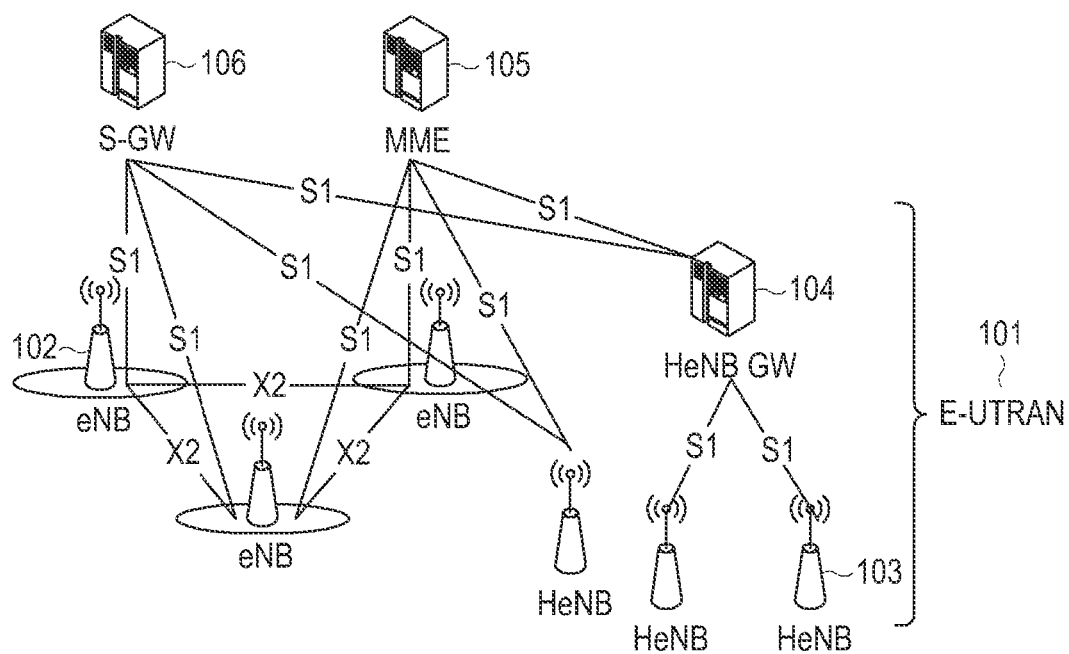
FIG. 1 a schematic diagram illustrating a structure of an existing System Architecture Evolution (SAE) system according to the related art.
Figure 2:
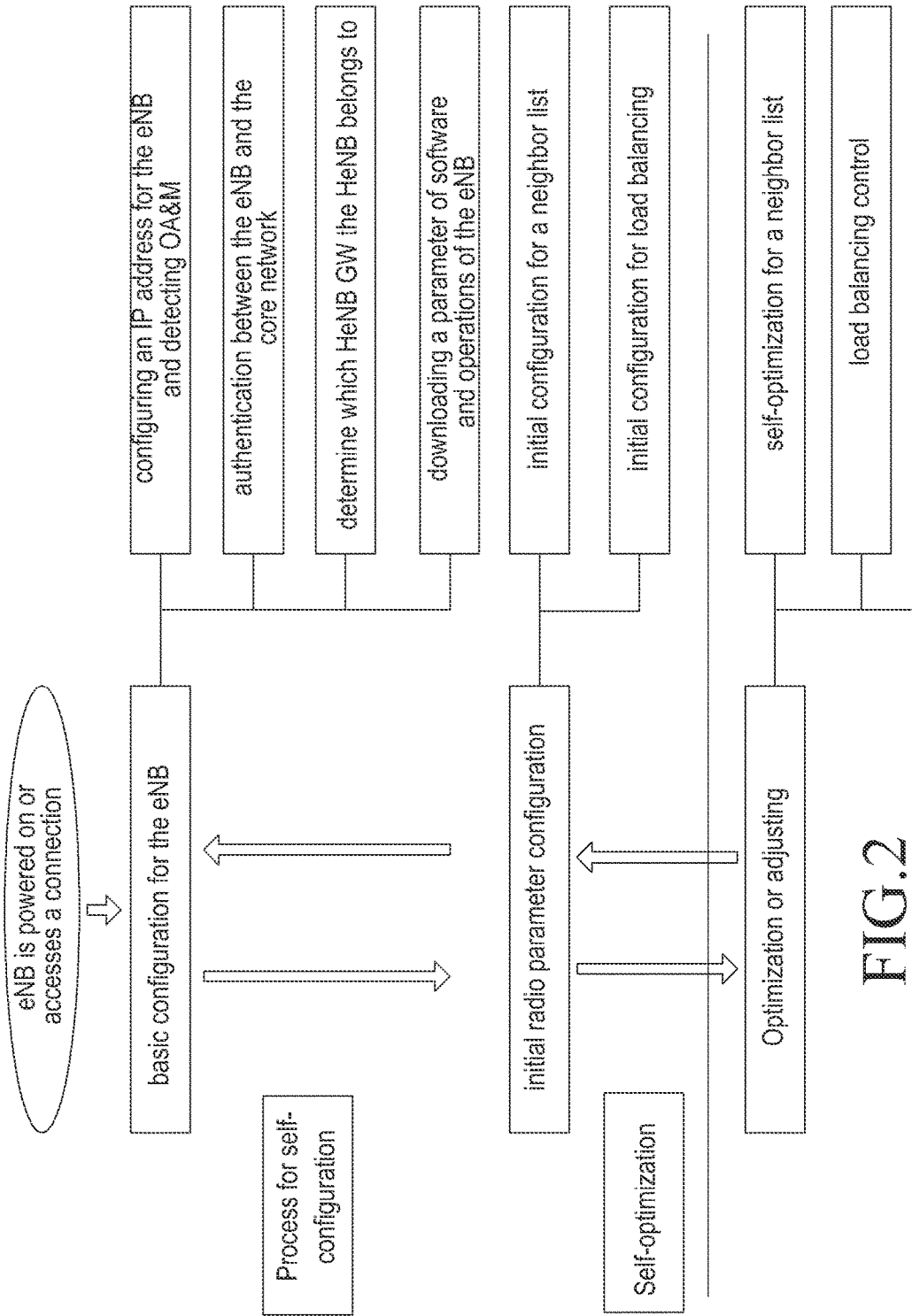
FIG. 2 is a schematic diagram illustrating a basic principle for performing existing self-optimization to a SAE system according to the related art.
Figure 3:
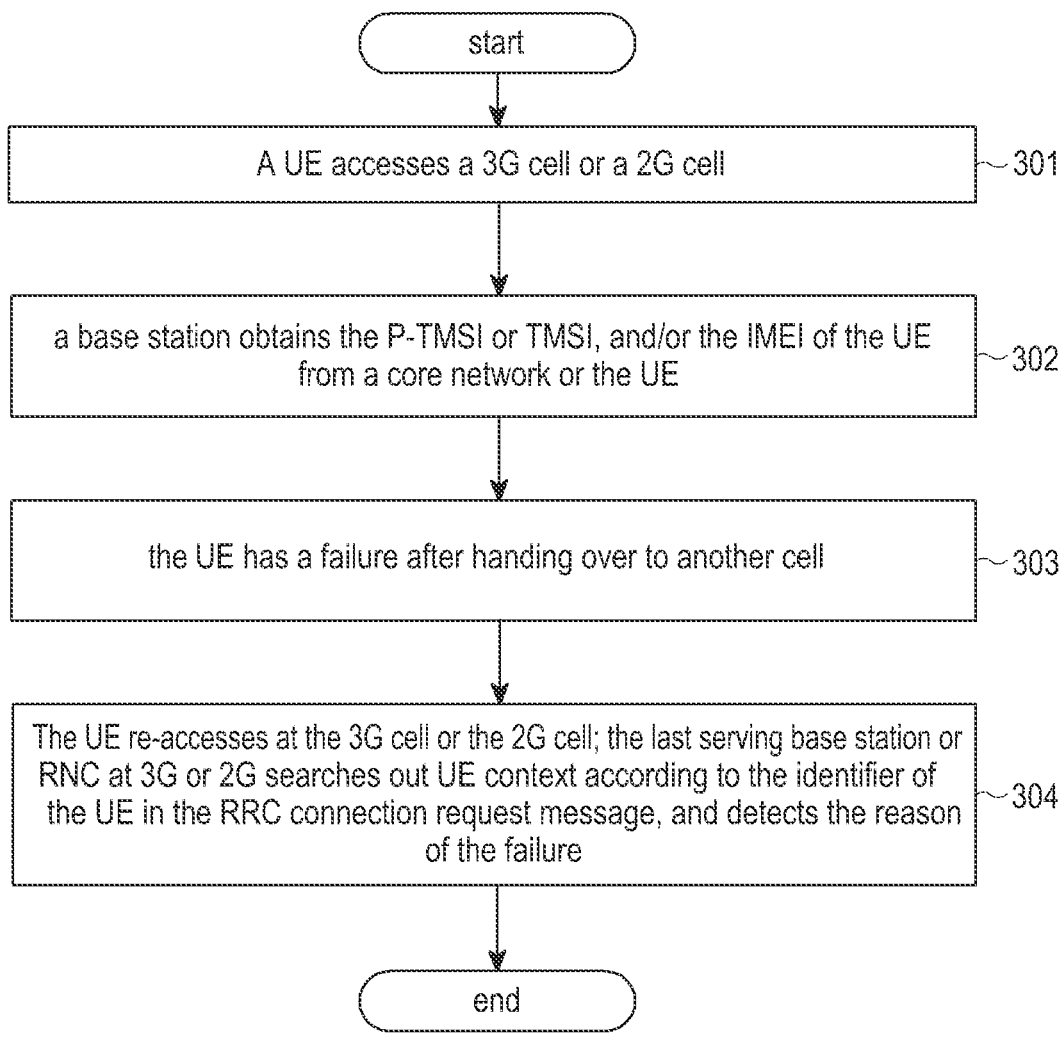
FIG. 3 is a flowchart illustrating a method for solving the problem 1 within a method for supporting Radio Link Failure (RLF) reason detection or handover failure reason detection according to an embodiment of the present disclosure.

FIG. 3 is a flowchart illustrating a method for solving the problem 1 within a method for supporting RLF reason detection or handover failure reason detection according to an embodiment of the present disclosure.

Referring to FIG. 3, at operation 301, a UE accesses one of a 2G cell or a 3G.

At operation 302, a base station (including a Radio Network Controller (RNC) or a Base Station Systems (BSS)) obtains an identifier of the accessing UE, wherein the identifier includes a packet temporary mobile identifier, and/or a temporary mobile identifier, and/or an International Mobile Equipment Identifier (IMEI). The RNC can also obtain a routing area identifier or a location area identifier.

There are two methods for the base station to get the above-mentioned information.

Method 1: A Core Network (CN) (e.g., a Serving GPS Support Node (SGSN) or a Master Switching Center (MSC)) sends the above-mentioned information to a base station. The CN may send the above-mentioned information to the base station through a public identity message or other Iu messages. The CN sends an International Mobile Subscriber Identification (IMSI) to the base station through the public identity message.

Method 2: a UE sends the above-mentioned information to a base station. If a RRC connection request message includes an IMSI of the UE, the UE sends a (Packet-Temporary Mobile Subscriber Identity) (P-TMSI) and/or an International Mobile Equipment Identification (IMEI) to the base station after receiving the P-TMSI and a Routing Area Identifier (RAI), or a (Temporary Mobile Subscriber Identity) TMSI and a Location Area Identifier (LAI) from a core network, wherein the message may further include a RAI where the UE is located. Or, the UE sends the TMSI and/or the IMEI to the base station, wherein the message may further include a LAI where the UE is located.

At operation 303, the UE hands over to another cell. The another (i.e., target) cell is a cell other than a cell serving the UE before a handover, e.g., a Long Term Evolution (LTE) cell, a 2G cell, or a 3G cell. After the handover, a source cell retains context information of the UE without releasing it. The source base station to which the source cell belongs saves a cell identifier and/or a Radio Access Technology (RAT) type of a target cell to which the UE is handed over to. The time for the source cell for retaining the UE context may be a configured fixed time value. After receiving an Iu release command from a CN, the source base station may also retain the UE context for a period of time without releasing the UE context. In this example, a failure occurs after the handover is completed.

At operation 304, the UE re-accesses a cell in the RNC. The UE sends a Radio Resource Control (RRC) connection request message to the base station. In the RRC connection request message, the UE will send one of an IMSI, a packet temporary mobile identifier and a routing area identifier, and a temporary mobile identifier and a location area identifier, and an IMEI of the UE to the base station. The base station searches out the UE context according to a UE identifier in the received message. The message sent from the UE to the base station may further include whether the establishment of the RRC connection is due to a Circuit Switched FallBack (CSFB).

If a reason for the establishment of the RRC connection is not due to the CSFB, the base station detects a reason for the failure according to the UE context. If information that there is a recent inter-RAT handover for the UE is included in the UE context, the UE accesses back to a source RNC to re-establish the RRC connection, then the RNC may determine as a too early inter-RAT handover. If information that there is a recent intra-RAT handover for the UE is included in the UE context, the UE accesses back to the source cell to re-establish the RRC connection, and then the RNC may determine as a too early handover.

At this time, the process of the method for solving the problem 1 within the method for supporting RLF reason detection or handover failure reason detection in accordance with the embodiment of the present disclosure is completed.

In the method for supporting RLF reason detection or handover failure reason detection in accordance with the embodiment of the present disclosure, the base station can find the UE context to detect the reason for the failure no matter which UE identifier is included in the RRC connection request message. The method may avoid the adverse impact on the UE. In the above-mentioned method of the present disclosure, the P-TMSI and/or the RAI and/or the IMEI may be sent to the base station by the UE after the UE receives the P-TMSI and the RAI from the CN, or, the TMSI and/or the LAI and/or the IMEI of the UE may be sent to the base station by the UE, so that when receiving a RRC connection request message from the UE next time, the base station can find the UE context to detect the reason for the failure no matter which UE identifier is included in the RRC connection request message.

Figure 4:
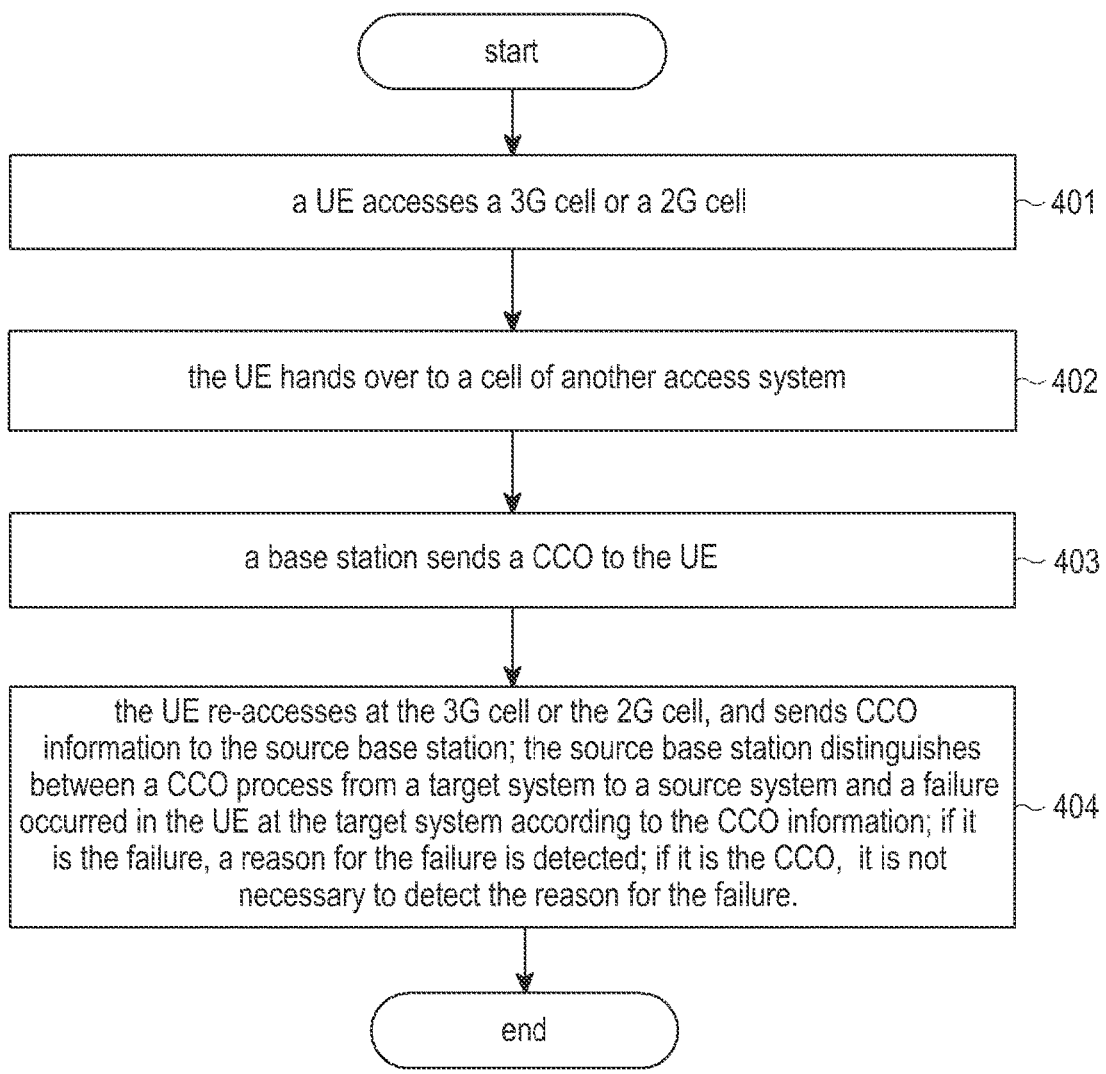
FIG. 4 is a flowchart illustrating a method for solving the problem 2 within a method for supporting RLF reason detection or handover failure reason detection according to an embodiment of the present disclosure.

FIG. 4 is a flowchart illustrating a method for solving the problem 2 within a method for supporting RLF reason detection or handover failure reason detection according to an embodiment of the present disclosure.

Referring to FIG. 4, at operation 401, a UE accesses a first cell such as a 3G cell or a 2G cell.

At operation 402, the UE hands over to a second cell of another access system. The second cell indicates the first cell is different from an access system where first cell serving is located, e.g., a LTE cell.

At operation 403, a base station where a target cell after the handover is located sends a Cell Change Order (CCO) message to the UE.

At operation 404, the UE re-accesses the first cell. The UE sends CCO information to the base station. The CCO information may be indication information of the CCO indicating that a reason for the establishment of a RRC connection is CCO. The source base station to which the source cell belongs may distinguish between a CCO process from a target system to a source system and a failure occurred in the UE at the target system according to the CCO information. If it is the failure, a reason for the failure is detected. If it is the CCO, the reason for the failure does need to be detected. The message sent from the UE to the base station may further include whether the establishment of the RRC connection is due to a CSFB. The reason for the failure does need to be detected either when it is the CSFB.

At this time, the process of the method for solving the problem 2 within the method for supporting RLF reason detection or handover failure reason detection in accordance with the embodiment of the present disclosure is completed.

In the method for supporting RLF reason detection or handover failure reason detection in accordance with the embodiment of the present disclosure, through sending CCO information by a UE to a base station to which the UE re-accesses, and the base station determining a reason for the establishment of the RRC connection is the CCO or a failure, if it is the CCO, the reason for not detecting the failure is MRO, so that an error statistic in the network is avoided, the accuracy of the MRO is improved, and the system performance is enhanced.

Figure 5:
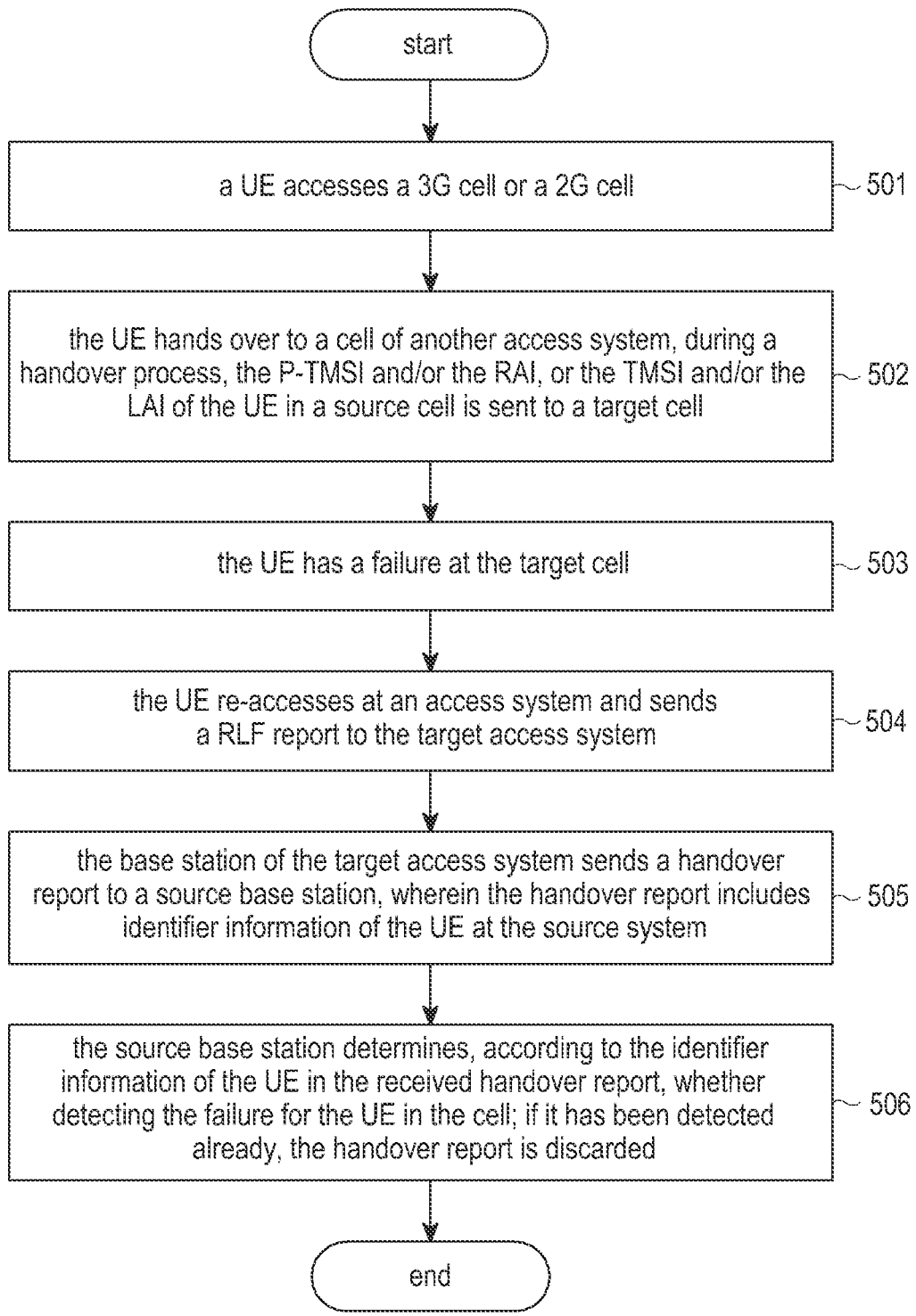
FIG. 5 is a flowchart illustrating a first method for solving the problem 3 within a method for supporting RLF reason detection or handover failure reason detection according to an embodiment of the present disclosure.

FIG. 5 is a flowchart illustrating a first method for solving the problem 3 within a method for supporting RLF reason detection or handover failure reason detection in accordance with an embodiment of the present disclosure.

Referring to FIG. 5, at operation 501, a UE accesses a first cell such as a 3G cell or a 2G cell.

At operation 502, the UE hands over to a second cell of another access system. The other access system indicates it is different from an access system where a first cell, e.g., a LTE cell. During the handover process, an identifier of the UE in a source access system is sent to a target base station. The UE identifier may be a one of a P-TMSI, a RAI, a TMSI, and a LAI.

The first way for sending to a target cell is to send, by a source base station, to the target base station through a source to target transparent container within a relocation requirement message or a handover request message.

The second way for sending to the target cell is to send, by a CN, the above-mentioned identifier of the UE to the target cell. It may be sent by a source CN to a target CN, and then sent by the target CN to the target base station.

The identifier of the UE in the source side is saved by the target base station to the UE context.

At operation 503, the UE has a failure in the target cell.

At operation 504, when the UE accesses back to a target access system, the UE sends a RLF report to a base station of the target access system. The base station receiving the RLF report of the UE sends RLF indication information to a base station located where a cell which was serving the UE when the failure occurred. The base station located where the cell which was serving the UE when the failure occurred determines a reason for the failure; the base station determines a reason for the failure according to the UE RLF report information. A specific method for determination is not the focus of the present disclosure, and a detailed technical description is ignored herein.

At operation 505, the base station located where the cell which was serving the UE when the failure occurred sends a handover report to the source base station, wherein the handover report includes an identifier of the UE at the source base station side. The identifier of the UE may be a P-TMSI and/or a RAI, or a TMSI and/or a LAI.

At operation 506, the source base station may determine, according to the UE identifier in the received handover report, whether a corresponding MRO problem (e.g., a too early inter-RAT handover) has been counted already for the UE in the cell, if it has been counted already, then the handover report is ignored.

At this time, the process of the first method for solving the problem 3 within the method for supporting RLF reason detection or handover failure reason detection in accordance with the embodiment of the present disclosure is completed.

Figure 6:
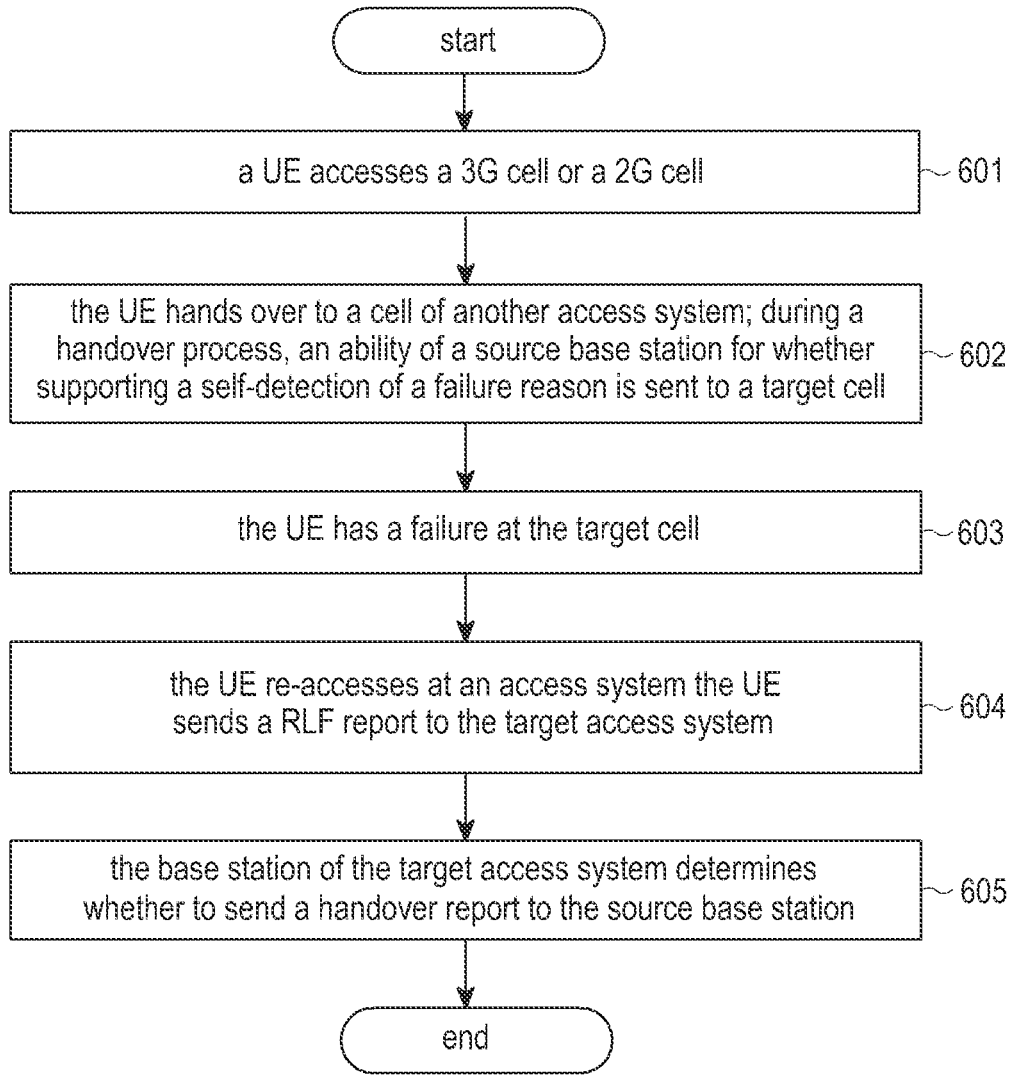
FIG. 6 is a flowchart illustrating a second method for solving the problem 3 within a method for supporting RLF reason detection or handover failure reason detection according to an embodiment of the present disclosure.

FIG. 6 is a flowchart illustrating a second method for solving the problem 3 within a method for supporting RLF reason detection or handover failure reason detection in accordance with an embodiment of the present disclosure. As shown in FIG. 6, the process includes following operations.

Referring to FIG. 6, at operation 601, a UE accesses a 3G cell or a 2G cell.

At operation 602, the UE hands over to a cell of another access system. Another access system indicates an access system other than an access system where a cell serving the UE before a handover locates, e.g., a LTE cell. During the handover process, an ability of a source base station for whether supporting a self-detection of a failure reason or a version of the source base station is sent to a target base station. The ability for supporting the self-detection of the failure reason includes an ability for whether supporting a self-detection of a too early inter-RAT handover from 3G or 2G to a target access system. Specifically, it may be sent by the source base station to the target base station through a source to target transparent container within a relocation requirement message or a handover request message.

The ability of the source base station for whether supporting the self-detection of the failure reason or the version of the source base station is saved by the target base station to the UE context.

At operation 603, the UE has a failure at a target cell.

At operation 604, when the UE accesses back to a target access system, the UE sends a RLF report to a base station of the target access system. The base station receiving the RLF report of the UE sends RLF indication information to a base station located where a cell which was serving the UE when the failure occurred. The base station where the cell which was serving the UE when the failure occurred locates determines a failure reason; the base station determines a failure reason according to the UE RLF report information. A specific method for determination is not the focus of the present disclosure, and a detailed technical description is ignored herein.

At operation 605, the base station located where the cell which was serving the UE when the failure occurred determines, according to the ability of the source base station for whether supporting the self-detection of the failure reason saved in the UE context, whether it is necessary to send a handover report to the source base station. For example, if the source base station supports the ability for the self-detection of the failure reason, it is not necessary to send the handover report to the source base station. If the ability of the source base station is a self-detection ability for a MRO event, such as a too early handover from 3G or 2G to LTE, when a base station located where the cell which was serving the UE when the failure occurred is a LTE base station, the LTE base station does not send the handover report to the source base station when the LTE base station determines that it is a too early handover from 3G or 2G to LTE, however, when it is a MRO event which could not be self-detected by other source base station, the handover report is still sent to the source base station, e.g., a 3G or 2G base station hands over the UE to a wrong LTE cell.

At this time, the process of the second method for solving the problem 3 within the method for supporting RLF reason detection or handover failure reason detection in accordance with the embodiment of the present disclosure is completed.

In the method for supporting RLF reason detection or handover failure reason detection according to an embodiment of the present disclosure, through sending new information by a source UE to a target base station, and the target base station determining whether it is necessary to send a handover report to the source base station or the target base station sending new information within the handover report to the source base station, it is ensured that the same failure is counted as one MRO event for the same UE in the same cell, so that an error statistic in the network is avoided, the accuracy of MRO is improved, and the system performance is enhanced.

Figure 7:
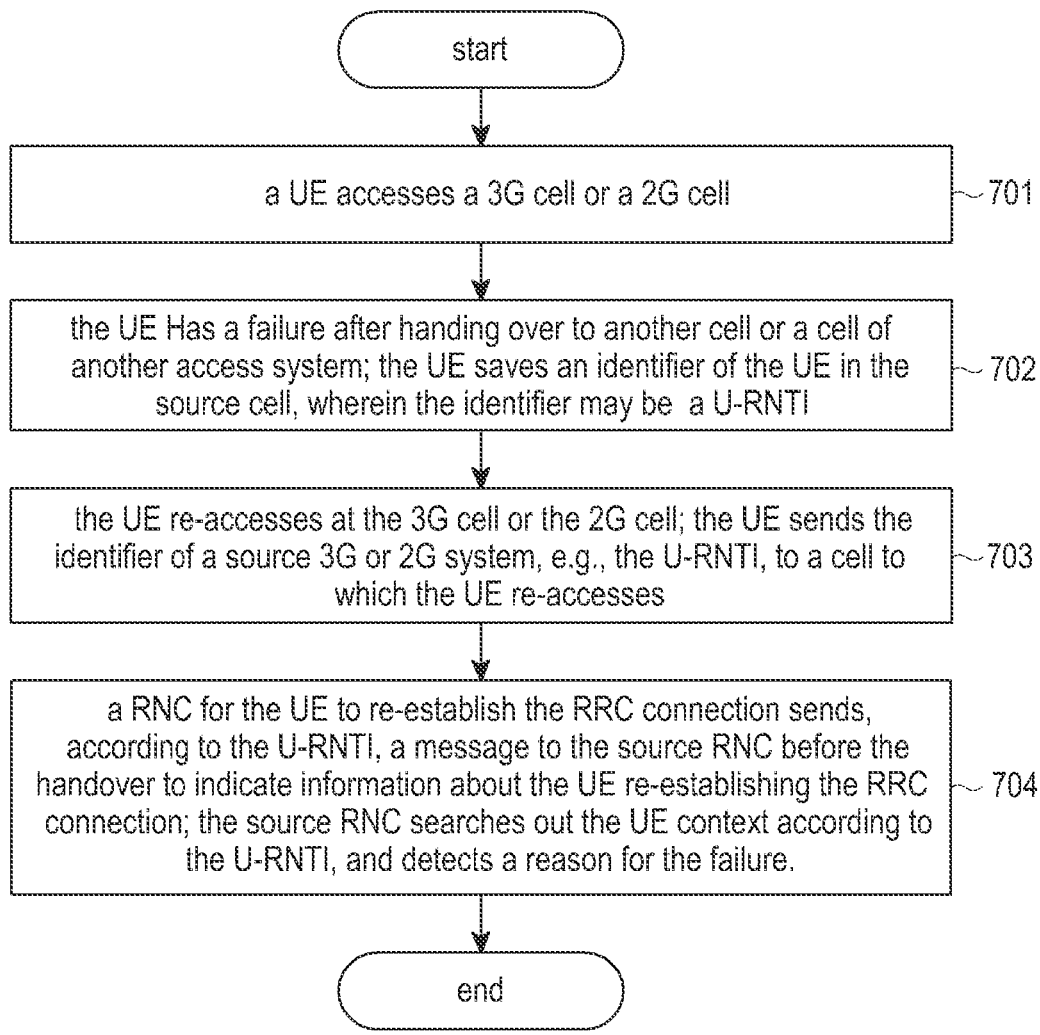
FIG. 7 is a flowchart illustrating a method for solving the problem 4 within a method for supporting RLF reason detection or handover failure reason detection according to an embodiment of the present disclosure.

FIG. 7 is a flowchart illustrating a method for solving the problem 4 within a method for supporting RLF reason detection or handover failure reason detection according to an embodiment of the present disclosure.

Referring to FIG. 7, at operation 701, a UE accesses a 3G cell or a 2G cell.

At operation 702, the UE hands over to another cell. Another cell indicates a cell other than a cell serving the UE before a handover, e.g., a LTE cell, or a 3G cell, or a 2G cell. After the handover, a source cell retains context information of the UE without releasing it. The source base station to which the source cell belongs saves a cell identifier and/or a RAT type of a target cell to which the UE handed over. The time for the source cell retaining the UE context may be a configured fixed time value. After receiving an Iu release command from a CN, the source base station may also retain the UE context for a period of time without releasing. A failure occurs after the handover succeeds. The UE has a failure. The UE saves an identifier of the UE in the source cell before the handover, wherein the identifier may be a U-RNTI.

At operation 703, the UE re-accesses at a 3G cell or a 2G cell. The UE sends the identifier in the source 3G or 2G system, e.g., the U-RNTI, to a cell to which the UE re-accesses, for example, the UE may send to a the cell to which the UE re-accesses through a RRC connection request message, a RRC connection establishment completion message or other RRC messages.

At operation 704, if a reason for the establishment of a RRC connection is not due to a CSFB or a CCO, a base station where the UE re-establishes the RRC connection sends, according to the U-RNTI of the UE, a handover message to the source base station where the UE is located before the handover to indicate information about the UE re-establishing the RRC connection. The source base station searches out the UE context according to the U-RNTI, and detects a reason for the failure. If information that there is a recent inter-RAT handover for the UE is included in the UE context, and the UE accesses back to a source RNC to re-establish the RRC connection, then the RNC may determine as a too early inter-RAT handover. If information that there is a recent intra-RAT handover for the UE is included in the UE context, and the UE accesses back to the source cell to re-establish the RRC connection, and then the RNC may determine as a too early handover.

At this time, the process of the method for solving the problem 4 within the method for supporting RLF reason detection or handover failure reason detection according to an embodiment of the present disclosure is completed.

In the method for supporting RLF reason detection or handover failure reason detection in accordance with the embodiment of the present disclosure, through recording identifier information at the source 3G or 2G systems by a UE, and sending the UE identifier to a base station to which the UE re-accesses when re-accessing at the 3G or 2G systems, a reason for the failure may still be detected without a RLF report when the base station to which the UE re-accesses is different from a source base station.

Figure 8:
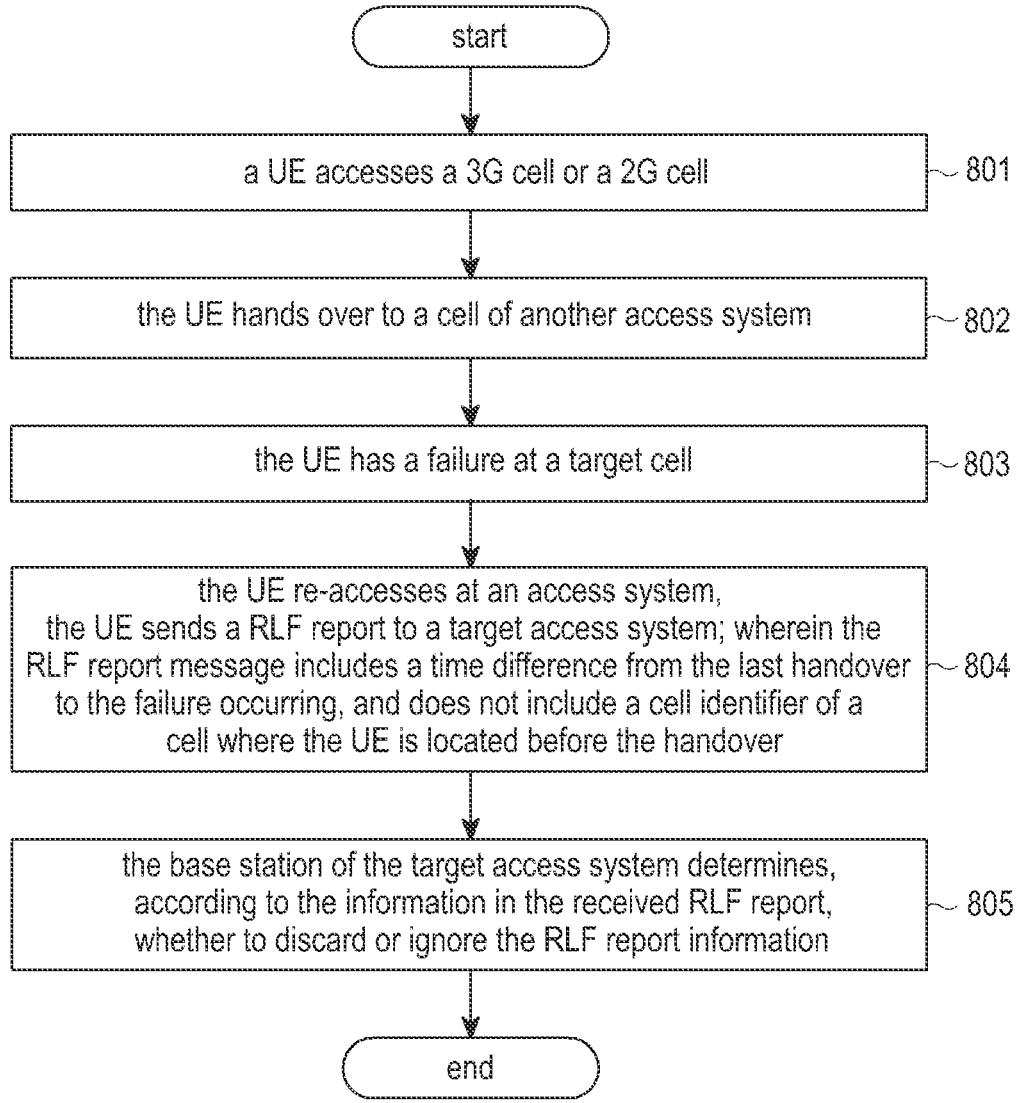
FIG. 8 is a flowchart illustrating a method for solving the problem 5 within a method for supporting RLF reason detection or handover failure reason detection according to an embodiment of the present disclosure.

FIG. 8 is a flowchart illustrating a method for solving the problem 5 within a method for supporting RLF reason detection or handover failure reason detection in accordance with an embodiment of the present disclosure.

Referring to FIG. 8, at operation 801, a UE accesses a 3G cell or a 2G cell.

At operation 802, the UE hands over to a cell of another access system. Another access system indicates an access system other than an access system with a cell serving the UE before a handover, e.g., a LTE cell.

At operation 803, the UE has a failure at a target cell.

At operation 804, when the UE accesses back to a target access system to re-establish the RRC connection, the UE sends a RLF report to a base station of the target access system. The RLF report message includes a time difference from the last handover to the failure occurring, which may be a time difference from a handover command of the last inter-RAT handover or a completion of the handover to the failure occurring. Because a source cell of the last handover is a 3G cell or a 2G cell, a cell identifier of the source cell last triggering the handover is not included, by the UE, in the RLF report. Because a cell trying to re-establish for the first time is a 3G cell or a 2G cell, an identifier of a cell re-establishing the RRC connection for the first time after the failure may also not be included in the RLF report either. Optionally, a base station receiving the RLF report of the UE sends RLF indication information to a base station located where a cell which was serving the UE when the failure occurred.

At operation 805, the base station of the target access system determines a reason for the failure. The reason for the failure may be determined either by a base station to which the UE re-accesses or the base station located where the cell which was serving the UE when the failure occurred. When the reason is determined, it is necessary to determine whether to discard or ignore the RLF report information. If information that there is a recent handover for the UE is included in the RLF report, i.e., a time difference from the last handover to the failure occurring reported by the UE is less than a fixed value, but a cell identifier of the source cell last triggering the handover is not included in the RLF report, the base station determines to discard or ignore the RLF report information. If it is determined not discarding, the base station determines the reason for the failure according to the UE RLF report information. A specific method for determination is not the focus of the present disclosure, and a detailed technical description is ignored herein.

At this time, the process of the method for solving the problem 5 within the method for supporting RLF reason detection or handover failure reason according to an embodiment of the present disclosure is completed.

Figure 9:
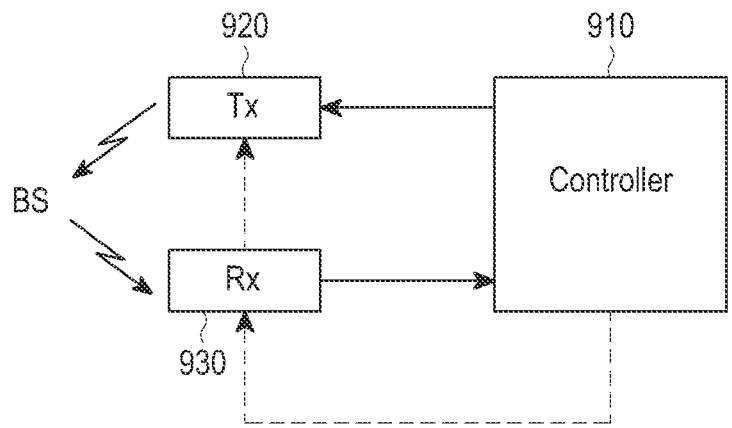
FIG. 9 is a block diagram of a user equipment according to an embodiment of the present disclosure.

FIG. 9 is a block diagram of a user equipment according to an embodiment of the present disclosure.

Referring to FIG. 9, the UE is configured to comprise a transmission unit 920, a reception unit 930, and a controller 910. The transmission unit 920 and the reception unit 930 respectively include a transmission circuitry and a reception circuitry for communicating with the network entity such as the base station and/or the RNC under the control of the controller 910 according to an exemplary embodiment of the present disclosure. The controller 910 control the access of a 3G cell or a 2G cell, and performing handover to a cell of another access system according to an exemplary embodiment of the present disclosure. And the controller 910 controls the transmission unit 920 to transmit CCO information.

Figure 10:
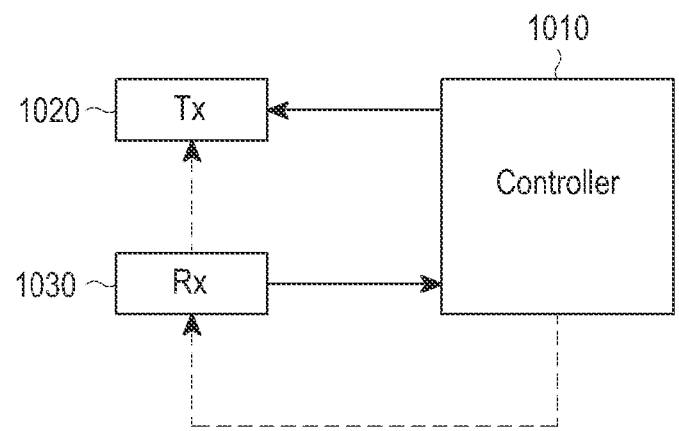
FIG. 10 is a block diagram of a network entity according to an embodiment of the present disclosure.

FIG. 10 is a block diagram of a network entity according to an embodiment of the present disclosure.

Referring to FIG. 10, the network entity may act as a base station or the RNC. In this example, the base station comprises a transmission unit 1020, a reception unit 1030, and a controller 1010. The transmission unit 1020 and the reception unit 1030 respectively include a transmission circuitry and a reception circuitry for communicating with at least one UE in cell according to an exemplary embodiment of the present disclosure. The controller 1010 controls performing handover of the UE, and control the reception unit 1030 to receive the CCO information from the UE according to an exemplary embodiment of the present disclosure.

In the method for supporting RLF reason detection or handover failure reason detection according to an embodiment of the present disclosure, through sending information which may be obtained currently to a base station by a UE, the base station determining to ignore or discard a RLF report according to specific information in the RLF report, the impact on the UE is avoided, the processing complexity of the base station is reduced, a wrong determination for the reason of the failure or a duplicate determination is avoided, and the system performance is enhanced.

In summary, by adopting the method apparatus for supporting RLF reason detection or handover failure reason detection provided by the present disclosure, the MRO problems can be detected without RLF reporting in 3G or 2G, the impact on a 3G or a 2G system is reduced, and then the correct self-optimization is performed to improve the performance of the mobile communication system.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for communicating, the method comprising:
acquiring, by a first base station, an identifier of a UE accessing a first cell of the first base station;
storing, by the first base station, UE context information of the UE after a handover of the UE to a second cell of a second base station, and storing a cell identifier of the second cell;
receiving, by the first base station, a radio resource control (RRC) connection request message after a radio link failure between the UE and the second cell occurs, the RRC connection request message including an identifier of the UE and information indication whether a reason for an establishment of a RRC connection is due to a circuit switched fallback (CSFB);
searching, by the first base station, a UE context based on the identifier of the UE in the RRC connection request message; and
detecting, by the first base station, a reason for the failure based on the UE context, if the reason is not due to the CSFB.

2. The method of claim 1, wherein the identifier of the UE is acquired from a core network (CN).

3. The method of claim 1, wherein the identifier of the UE is acquired from the UE.

4. The method of claim 3, wherein the identifier further comprises a routing area identifier (RAI) or a location area identifier (LAI) where the UE is located.

5. The method of claim 1, wherein the detecting comprises:
if information about the second cell belonging to another radio access technology (RAT) is included in the context of the UE, and the UE re-establishes the RRC connection with the first cell and the first base station determines a too early inter-RAT handover; and
if information about the second cell belongs to the same RAT is included in the context of the UE, and the UE re-establishes the RRC connection with the first cell and the first base station determines a too early handover.

6. A method for communicating, the method comprising:
accessing, by a user equipment (UE), a first cell of a first base station;
handing over, by the UE, to a second cell of a second base station; and
transmitting, by the UE, a radio resource control (RRC) connection request message after a radio link failure between the UE and the second cell occurs, the RRC connection request message including an identifier of the UE and information indication whether a reason for an establishment of a RRC connection is due to a circuit switched fallback (CSFB),
wherein a UE context is searched, by the first base station, based on the identifier of the UE in the RRC connection request message, and
wherein a reason for the failure is detected, by the first base station, based on the UE context, if the reason is not due to the CSFB.

7. The method of claim 6, wherein the identifier of the UE is acquired, by the first base station, from the UE.

8. The method of claim 7, wherein the identifier of the UE further comprises a routing area identifier (RAI) or a location area identifier (LAI) where the UE is located.

9. An apparatus in a first base station, the apparatus comprising:
a transmitter;
a receiver; and
at least one processor configured to:
acquire an identifier of a user equipment (UE) accessing a first cell of the first base station,
store UE context information of the UE after a handover of the UE to a second cell of a second base station, and storing a cell identifier of the second cell,
receive a radio resource control (RRC) connection request message after a radio link failure between the UE and the second cell occurs, the RRC connection request message including an identifier of the UE and information indication whether a reason for an establishment of a RRC connection is due to a circuit switched fallback (CSFB),
search a UE context based on the identifier of the UE in the RRC connection request message, and
detect a reason for the failure based on the UE context, if the reason is not due to the CSFB.

10. The apparatus of claim 9, wherein the identifier of the UE is acquired from a core network (CN).

11. The apparatus of claim 9, wherein the identifier of the UE is acquired from the UE.

12. The apparatus of claim 11, wherein the identifier of the UE further comprises a routing area identifier (RAI) or a location area identifier (LAI) where the UE is located.

13. The apparatus of claim 9,
wherein if information about the second cell belonging to another radio access technology (RAT) is included in the context of the UE, the UE re-establishes the RRC connection with the first cell and the first base station determines a too early inter-RAT handover, and
wherein if information about the second cell belongs to the same RAT is included in the context of the UE, the UE re-establishes the RRC connection with the first cell and the first base station determines a too early handover.

14. An apparatus of a user equipment (UE), the apparatus comprising:
a transmitter;
a receiver; and
at least one processor configured to:
access a first cell of a first base station,
hand over to a second cell of a second base station,
transmit a radio resource control (RRC) connection request message after a radio link failure between the UE and the second cell occurs, the RRC connection request message including an identifier of the UE and information indication whether a reason for an establishment of a RRC connection is due to a circuit switched fallback (CSFB),
wherein a UE context is searched, by the first base station, based on the identifier of the UE in the RRC connection request message, and a reason for the failure is detected, by the first base station, based on the UE context, if the reason is not due to the CSFB.

15. The apparatus of claim 14, wherein the identifier of the UE is acquired, by the first base station, from the UE.

16. The apparatus of claim 15, wherein the identifier of the UE further comprises a routing area identifier (RAI) or a location area identifier (LAI) where the UE is located.

* * * * *